Patented June 25, 1940

2,205,487

UNITED STATES PATENT OFFICE 2,205,487

ARALKYL ETHERS OF HIGH MOLECULAR CARBOHYDRATES

Karl Meinel, Dormagen-I. G. Werk, near Cologne, Germany, assignor to Hercules Powder Company, Wilmington, Del., a corporation of Delaware No Drawing. Application March 26, 1938, Serial No. 198,230. In Germany June 16, 1937

7 Claims. (Cl. 260—231)

This invention relates to a process of preparation of aralkyl ethers of high molecular carbohydrates, particularly cellulose.

Aralkyl ethers of cellulose, for example, benzyl cellulose, can, it is known, be prepared by reacting alkali cellulose with aralkyl halides. Herein it is necessary, in order to obtain the desired products having homogeneous solubility in organic solvents, to use a relatively large excess of alkali and aralkyl halide. In doing this a substantial portion of the halide used is converted into a mixture of the corresponding alcohol and ether. In the preparation of benzyl cellulose, for example, there is formed as a by-product a mixture of benzyl alcohol and dibenzyl ether, called "benzyl oil." Since these by-products must be reworked, and moreover since they make difficult the purification of the cellulose ether, it is desirable to prevent their formation as much as possible. This can be done, for example, by the use of smaller quantities of aralkyl halide, but in such a case a uniformly soluble product can no longer be obtained. On the other hand, tests have already been carried out to depress the undesired side reactions by adding the aralkyl halide in several portions, with subsequent addition of alkali, by the co-action of solvents and diluents, but this always requires very long reaction times in order to produce the desired homogeneous product.

It has now been found that a particularly advantageous method of aralkylation of cellulose and similar carbohydrates comprises the reaction of alkali cellulose with the aralkyl halide in the presence of a boron compound. In this process relatively small quantities of aralkyl halide (for example, 4 parts by weight to 1 part by weight of cellulose) are used and the cellulose ether is produced in a relatively short reaction time and this cellulose ether is homogeneously soluble in the usual organic solvents, such as, toluol, xylol and so forth, and at the same time the quantity of the above mentioned undesired by-products is substantially reduced.

The boron compounds can be added to the reaction mass, for example, in the form of boric acid or borates. They can be in solid form or in aqueous, neutral or alkali solutions. The addition of pulverized boric acid to the alkali cellulose during its preparation, then kneading it therein for some time, has been found particularly advantageous. The quantity added can vary within certain limits, and, for example, can amount to 20–50% of the weight of cellulose.

The etherification is then accomplished in the usual manner in the presence of an excess of alkali, for example 1.5 to 3 parts by weight per 1 part by weight of cellulose, with addition of an aralkyl halide. Since only a relatively small excess of the latter is required, and since the reaction mass is, therefore, highly viscous, it is preferable to add a suitable solvent or diluent, for example, benzol, toluol, or particularly dibenzyl ether.

The process is furthermore explained by the following examples:

Example 1

One part by weight of cellulose, kneaded for several hours with 2.5 parts by weight of caustic soda in the form of 30–50% caustic solution then 0.4 part by weight of boric acid are added and kneaded for one hour with the alkali cellulose. Thereupon 3 parts by weight of benzyl chloride and 3 parts by weight of dibenzyl ether are added and the reaction mass heated in the usual way to 110–120° C. After heating for 5 hours a further addition of 1 part by weight of benzyl chloride and 0.4 part by weight of pulverized caustic soda are added and the mass further heated. After heating for about 12 hours the benzyl cellulose obtained has the desired properties, i. e., it is completely soluble in a mixture of toluol-butanol 9:1. Analysis shows 53.5 benzyl. Instead of solid boric acid, a solution of boric acid in water or a solution of boric acid in caustic alkali used for the alkali cellulose, can be employed.

Example 2

The process is carried out as in Example 1 but instead of boric acid, 0.6 part by weight of finely divided borax or borax in solution are added to the alkali cellulose.

What I claim and desire to protect by Letters Patent is:

1. A process for the preparation of an aralkyl ether of cellulose which comprises reacting alkali cellulose containing an alkali metal borate as a catalyst admixed therewith, with an aralkyl halide.

2. A process for the preparation of an aralkyl ether of cellulose which comprises treating cellulose with a caustic alkali in amount within the range of about 1.5 parts to about 3 parts by weight of the cellulose and an amount of boric acid within the range of about 20% to about 50% by weight of the cellulose to produce alkali cellulose, and reacting the alkali cellulose with an aralkyl halide.

3. A process for the preparation of a benzyl ether of cellulose which comprises reacting alkali cellulose containing borax admixed therewith, as a catalyst, with benzyl chloride.

4. A process for the preparation of an aralkyl ether of a carbohydrate which comprises reacting alkali carbohydrate containing admixed therewith, as a catalyst, a boron compound selected from the group consisting of boron compounds soluble in aqueous neutral solutions and boron compounds soluble in aqueous alkaline solutions, with an aralkyl halide, the reaction mixture containing an excess of caustic alkali.

5. A process for the preparation of an aralkyl ether of cellulose which comprises reacting alkali cellulose containing admixed therewith, as a catalyst, a boron compound selected from the group consisting of boron compounds soluble in aqueous neutral solutions and boron compounds soluble in aqueous alkaline solutions, with an aralkyl halide, the reaction mixture containing an excess of caustic alkali.

6. A process for the preparation of a benzyl ether of cellulose which comprises reacting alkali cellulose containing admixed therewith, as a catalyst, a boron compound selected from the group consisting of boron compounds soluble in aqueous neutral solutions and boron compounds soluble in aqueous alkaline solutions, with benzyl chloride, the reaction mixture containing an excess of caustic alkali.

7. A process for the preparation of an aralkyl ether of cellulose which comprises treating cellulose with a caustic alkali in amount within the range of about 1.5 to about 3 parts by weight of the cellulose and an amount of alkali metal borate in quantity equivalent to boric acid within the range of about 20% to about 50% by weight of the cellulose to produce alkali cellulose, and reacting the alkali cellulose with an aralkyl halide.

KARL MEINEL.